US009388882B2

(12) United States Patent
Takano et al.

(10) Patent No.: US 9,388,882 B2
(45) Date of Patent: Jul. 12, 2016

(54) TENSIONER ASSEMBLY

(71) Applicants: Takehiro Takano, Shizuoka (JP); Seiji Sato, Shizuoka (JP)

(72) Inventors: Takehiro Takano, Shizuoka (JP); Seiji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 268 days.

(21) Appl. No.: 13/947,201

(22) Filed: Jul. 22, 2013

(65) Prior Publication Data

US 2014/0031157 A1    Jan. 30, 2014

(30) Foreign Application Priority Data

Jul. 24, 2012    (JP) ................................ 2012-163735

(51) Int. Cl.
*F16H 7/12*    (2006.01)
*F16C 33/78*    (2006.01)
*F16C 35/063*    (2006.01)
(Continued)

(52) U.S. Cl.
CPC ............ *F16H 7/1281* (2013.01); *F16C 13/006* (2013.01); *F16C 33/586* (2013.01); *F16C 33/7889* (2013.01); *F16C 35/063* (2013.01); *F16H 7/12* (2013.01); *F16H 7/20* (2013.01); *F16C 19/06* (2013.01); *F16C 2226/60* (2013.01);
(Continued)

(58) Field of Classification Search
CPC ........... F16H 7/12; F16H 7/1281; F16H 7/20; F16H 2007/0865; F16H 2007/0893; F16C 13/006; F16C 19/06; F16C 226/60; F16C 33/7889; F16C 35/063

USPC .......................................................... 474/135
See application file for complete search history.

(56) References Cited

U.S. PATENT DOCUMENTS 4,983,145 A * 1/1991 Hirai ...................... F16H 7/1218
                                                    474/117
5,234,385 A * 8/1993 Kawashima .......... F16H 7/1218
                                                    474/135
(Continued)

FOREIGN PATENT DOCUMENTS

EP         1 783 400       5/2007
JP         11-247871       9/1999
(Continued)

OTHER PUBLICATIONS

Japanese Office Action issued Sep. 29, 2015 in corresponding Japanese Patent Application No. 2012-163735 (with English translation).

*Primary Examiner* — William E Dondero
*Assistant Examiner* — Robert T Reese
(74) *Attorney, Agent, or Firm* — Wenderoth, Lind & Ponack, L.L.P.

(57) ABSTRACT

A tensioner assembly includes a pulley arm pivotable about a pivot shaft, and a tension pulley mounted on the pulley arm at its end remote from the pivot shaft and pressed against a belt to keep the tension of the belt. The tension pulley is rotatably mounted around a base portion of the pulley arm through a rolling bearing with the inner surface and axial rear end surface of the bearing inner race in contact with the outer peripheral surface of the base portion and an end surface of a shoulder of the base portion, respectively. The base portion has an axial through hole formed with an internal thread on its inner surface. A support bolt is threaded into the through hole from the axial front end to press the rolling bearing against the end surface of the shoulder. The internal thread has an axial front end located in the vicinity of, or axially rearwardly of, the end surface of the shoulder.

12 Claims, 6 Drawing Sheets

(51) Int. Cl.
*F16C 13/00* (2006.01)
*F16H 7/20* (2006.01)
*F16C 33/58* (2006.01)
*F16H 7/08* (2006.01)
*F16C 19/06* (2006.01)

(52) U.S. Cl.
CPC . *F16H 2007/0865* (2013.01); *F16H 2007/0893* (2013.01)

(56) References Cited

U.S. PATENT DOCUMENTS

| | | | | | |
|---|---|---|---|---|---|
| 5,405,296 | A | * | 4/1995 | Cerny | F16F 15/126 464/89 |
| 6,659,896 | B1 | * | 12/2003 | Stief | F16H 7/1281 474/112 |
| 2003/0083164 | A1 | * | 5/2003 | MacNaughton | F16H 7/1218 474/135 |
| 2006/0264280 | A1 | * | 11/2006 | Dell | F16H 55/36 474/70 |
| 2008/0300077 | A1 | | 12/2008 | Kapfer et al. | |
| 2009/0275432 | A1 | * | 11/2009 | Dell | F16H 7/1218 474/135 |
| 2010/0234155 | A1 | * | 9/2010 | Antchak | F16H 7/1218 474/135 |
| 2011/0111900 | A1 | * | 5/2011 | Wilson | F16C 13/006 474/166 |

FOREIGN PATENT DOCUMENTS

| | | |
|---|---|---|
| JP | 11-294467 | 10/1999 |
| JP | 2002-122194 | 4/2002 |
| JP | 2006-029537 | 2/2006 |
| JP | 2007-292161 | 11/2007 |

* cited by examiner

TENSIONER ASSEMBLY

CROSS REFERENCE TO RELATED APPLICATIONS

This application is based on and claims priority under 35 U.S.C. sctn. 119 with respect to Japanese Patent Application No. 2012-163735, filed on Jul. 24, 2012, the entire content of which is incorporated herein by reference.

BACKGROUND OF THE INVENTION

This invention relates to a tensioner assembly for adjusting the tension of a belt for driving vehicle engine accessories such as an alternator, a water pump and the compressor of an air-conditioner.

Figure 4:
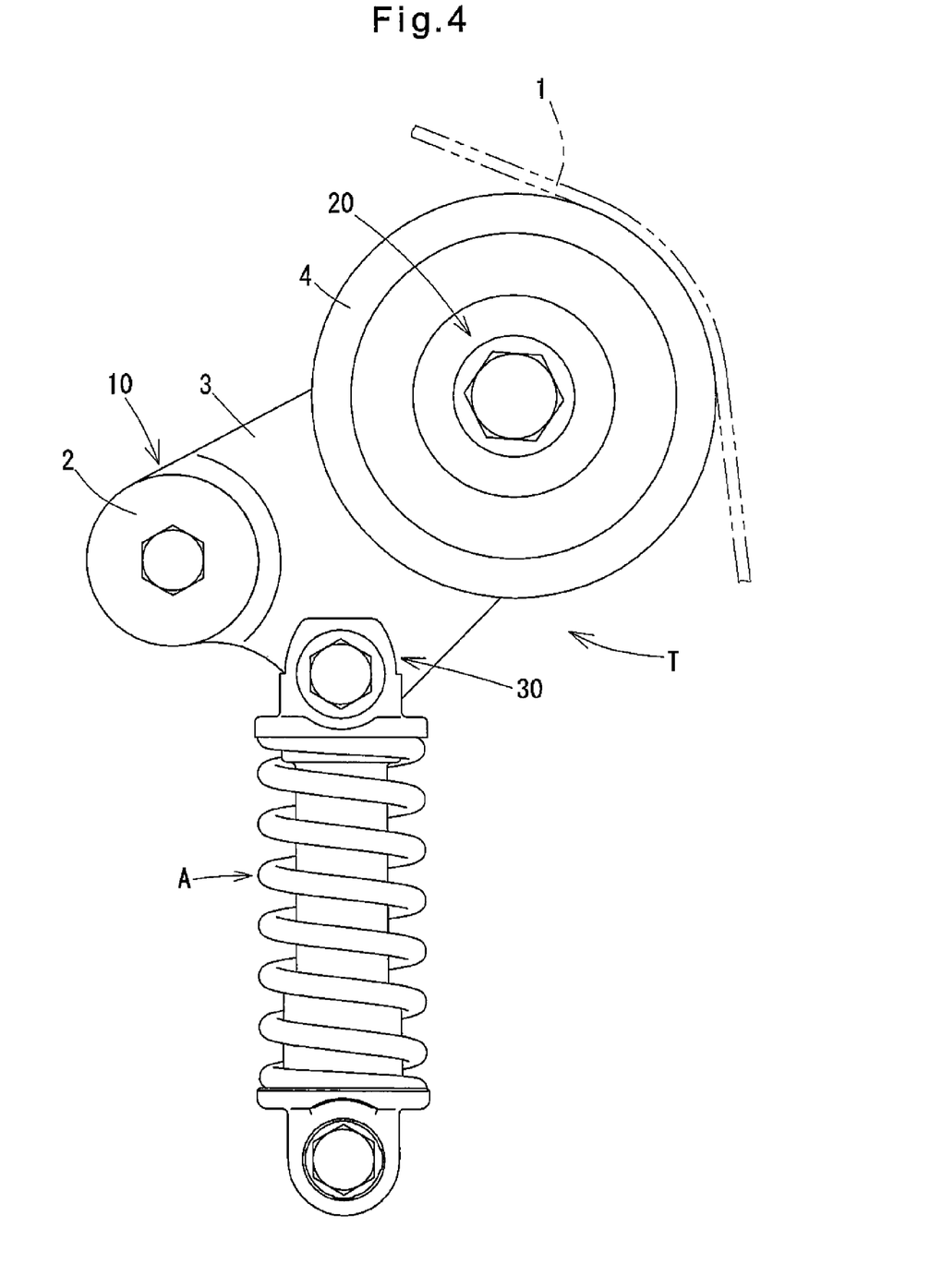
FIG. 4 is a front view of a tension adjusting device for an engine accessory driving belt.

This tensioner assembly (tension adjusting device) T is used in most belt transmission systems for transmitting the rotation of an engine crankshaft to various vehicle engine accessories, as shown in FIG. 4.

The tensioner assembly T includes a bracket (also known as a "pulley arm") 3 provided on the slack side of the belt 1 so as to be pivotable about a pivot shaft 2, a tension pulley 4 supported on the pulley arm 3 at the remote end from the pivot shaft 2, and a tensioner A which applies an adjusting force to the pulley arm 3, thereby pressing the tension pulley 4 against the belt 1, keeping constant the tension of the belt 1.

Figures 3A, 3B:
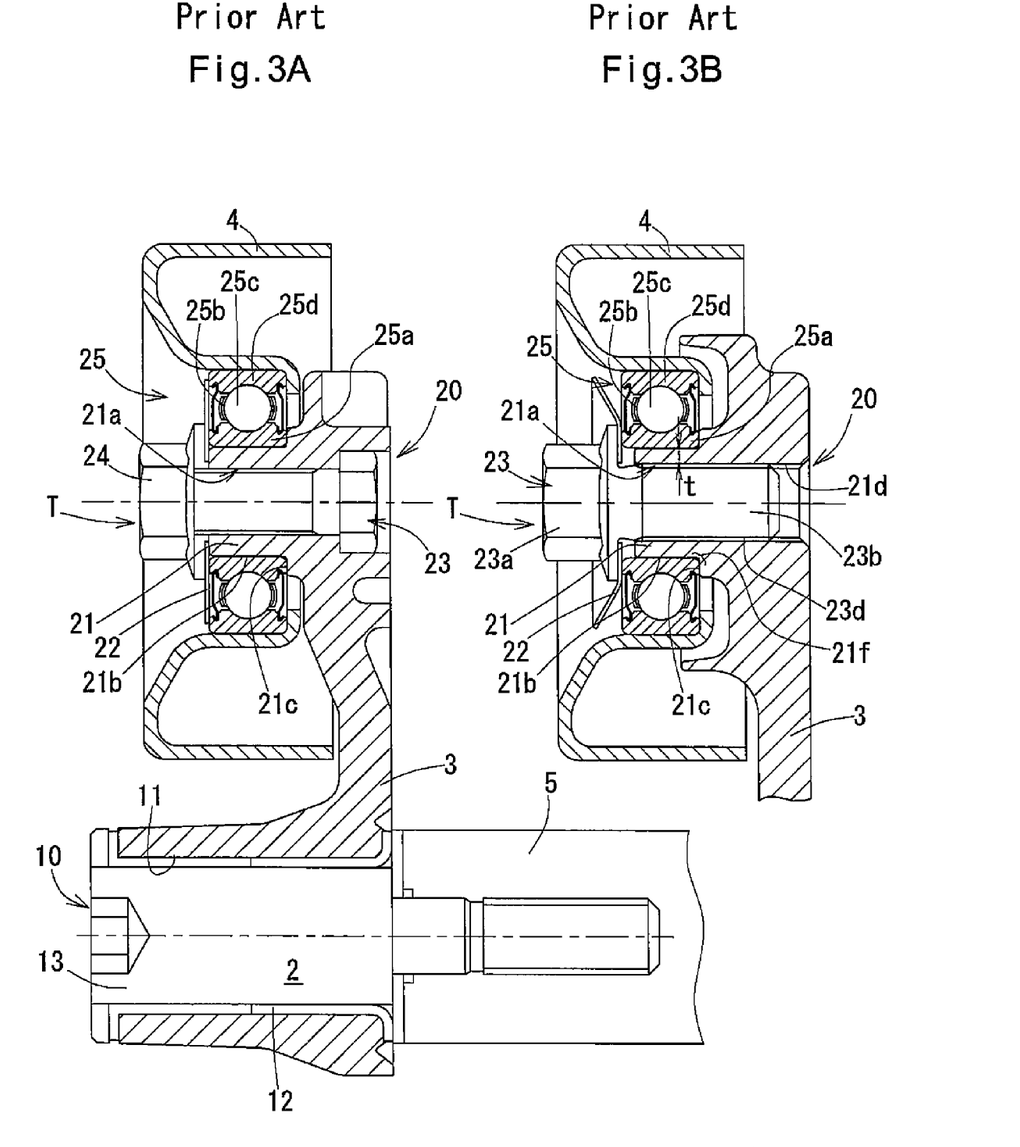
FIGS. 3A and 3B are vertical sectional views of conventional tensioner assemblies.

The pulley arm 3 is formed by casting e.g. an aluminum alloy or iron as a monolithic body. As shown in FIGS. 3A and 4, the pulley arm 3 includes a pivotally supported section 10 through which the pivot shaft 2, which is supported on a stationary member 5 such as a cylinder block, is inserted, a pulley supporting section 20 on which the tension pulley 4 is rotatably supported, and a damper mounting section 30 to which the tensioner A is connected. Many of such tensioners A are hydraulic tensioners which perform their damper functions using hydraulic pressure.

The pivotally supported section 10 is formed with a through hole 11 through which a support bolt 13 as the pivot shaft 2 is inserted with a liner 12 disposed between the bolt 13 and the hole 11. The pulley supporting section 20 and the damper mounting section 30 are thus pivotable about the pivotally supported section 10, more specifically about the center axis of the pivot shaft 2.

The tension pulley 4 is mounted on a base portion 21 of the pulley supporting section 20 through a rolling bearing 25 such as a ball bearing. The base portion 21 is formed with a through hole 21a extending in the axial direction of the tension pulley 4. The through hole 21a has a cylindrical surface having a diameter large enough such that the shank of a support bolt 23 can be inserted through the hole 21a. The rolling bearing 25 has its inner race 25a fitted on the outer surface 21b of the base portion 21.

The rolling bearing 25 further includes an outer race 25d disposed around the inner race 25a through a plurality of rolling elements 25c circumferentially retained by a retainer 25b. The tension pulley 4 is fixedly press-fitted on the outer race 25d.

The rolling bearing 25 is pushed by the support bolt 23 and a nut 24 thorough a washer 22 from the axial front side (from which the rolling bearing 25 and the tension pulley 4 are fitted onto the base portion 21) toward the axial rear side until the inner race 25a abuts an end surface 21c forming a shoulder of the base portion 21 at the axial rear portion of the base portion 21 such that the rolling bearing 25 is fixed to the base portion 21. The tension pulley 4 is thus rotatably supported by the pulley arm 3 such that the tension pulley 4 guides the belt 1.

FIG. 3B shows a different arrangement in which the rolling bearing 25 is fixed to the pulley arm 3 only by the support bolt 23 and without using the nut 24. In this arrangement, an internal thread 21d is formed on the inner surface of the through hole 21a over the entire length thereof. By inserting the shank 23b of the support bolt 23 toward the axial rear side with the head 23a of the bolt 23 positioned on the axial front side, the internal thread 21d of the through hole 21a is brought into threaded engagement with (meshes with) the external thread 23d on the support bolt 23 (as shown in European patent publication 1783400).

In the arrangement of FIG. 3A, the rolling bearing 25 is fixed to the base portion 21 by tightening the support bolt 23 and the nut 24 from both axial ends of the base portion 21. This is troublesome.

In the arrangement of FIG. 3B, since no nut 24 is used, the rolling bearing 25 can be fixed to the base portion 21 simply by tightening the support bolt 23 from the axially front end.

But in the arrangement of FIG. 3B, if the support bolt 23, which has been inserted into the through hole 21a of the base portion 21, is tightened with an excessive torque, cracks may form at the corner 21f of the base portion 21. If a force exceeding the projected upper limit continuously acts on the pulley arm 3 too, cracks may form at the corner 21f of the base portion 21.

Such cracks form because the portion of the base portion 21 supporting the rolling bearing 25 has an especially small wall thickness t, so that stress tends to concentrate on the corner 21f between the outer peripheral surface 21b of the thin-walled portion of the base portion 21 and the end surface 21c of the shoulder of the base portion 21 when the support bolt 23 is tightened or when force is applied from the pulley arm 3.

SUMMARY OF THE INVENTION

An object of the present invention is to minimize cracks at the corner between the outer periphery of the portion of the base portion of the pulley arm supporting the rolling bearing and the end surface of the shoulder of the base portion.

According to the present invention, the present invention provides a tensioner assembly comprising a pivot shaft, a pulley arm pivotable about the pivot shaft and having a base portion at an end of the pulley arm remote from the pivot shaft, a tension pulley rotatably mounted around the base portion through a rolling bearing, and a tensioner connected to the pulley arm and biasing the pulley arm such that the pulley arm pivots about the pivot shaft in the direction in which the tension pulley is pressed against a belt, thereby keeping constant the tension of the belt, wherein the rolling bearing comprises an inner race having a radially inner surface in contact with an outer peripheral surface of the base portion, and an end surface formed at the axial rear end of the inner race and in contact with an end surface of a shoulder of the base portion, and wherein the base portion is formed with a through hole extending in the axial direction of the base portion and having an inner surface formed with an internal thread having an axial front end located in the vicinity of or axially rearwardly of the end surface of the shoulder of the base portion.

The internal thread, which meshes with the external thread of the support bolt, is provided only in the axially rear portion of the through hole formed in the pulley arm, that is, its axial front end is located in the vicinity of or axially rearwardly of the end surface of the base portion. With this arrangement, it is possible to reduce tensile stress applied to the portion of the base portion supporting the rolling bearing, including the corner of the base portion between the outer peripheral surface of the base portion and the end surface of the shoulder of the base portion, because at this portion, the internal thread is not in threaded engagement with the external thread. This in turn reduces cracks at the corner of the base portion.

As used herein, "an internal thread having an axial front end located in the vicinity of and axially rearwardly of the end surface of the shoulder of the base portion" means that the internal thread is provided only within an area where the meshing engagement between the internal thread and the external thread would not produce tensile stress that could cause cracks at the corner of the base portion between the outer peripheral surface of the base portion and the end surface of the shoulder of the base portion. Thus preferably, the axial front end of the internal thread (including its incomplete thread portion, if any) is located so as to be radially aligned with or axially rearwardly of the end surface of the shoulder of the base portion.

But the axial front end of the internal thread may be located slightly axially forwardly of the end surface of the shoulder of the base portion, provided the axial front end is located in the above-defined "vicinity" of the end surface of the shoulder of the base portion, where the internal thread would not cause cracks at the corner of the base portion. For example, only the incomplete thread portion of the internal thread, or only the axial front end portion of the internal thread which is equal to about one or two pitches of the thread may be located axially forwardly of the end surface of the shoulder of the base portion.

The axial rear end of the internal thread is ordinarily located at the axial rear end of the through hole, because the internal thread is formed by inserting a tapping tool from the axial rear end of the through hole.

In an alternative arrangement, the inner race has a chamfer extending along the ridge between the radially inner surface of the inner race and the end surface of the inner race, and the internal thread has an axial front end radially aligned with, or located axially rearwardly of, the axial front end of the chamfer.

With this arrangement too, since the internal thread is provided only in the axially rear portion of the through hole, it is possible to reduce tensile stress that acts on the corner between the outer peripheral surface of the base portion and the end surface of the shoulder of the base portion, thereby reducing formation of cracks at this corner.

In another alternative arrangement, the base portion has a curved surface provided between, and smoothly connecting together, the outer peripheral surface of the base portion and the end surface of the shoulder of the base portion, and the internal thread has an axial end surface radially aligned with, or located rearwardly of, the axial front end of the curved surface. With this arrangement too, the above-described same advantage is achievable.

Preferably, the above-described curved surface has a circular arc-shaped section having a radius of curvature of 0.5 mm or larger, with the above-described chamfer having an axial length larger than the radius of curvature of the curved surface.

In any of the above-described arrangements, preferably, the outer peripheral surface of the base portion which is in contact with the inner surface of the bearing inner race has an axial length equal to or larger than half the entire axial length of the bearing inner race.

The inner surface of the through hole of the pulley arm has a cylindrical portion, i.e. a portion not formed with the internal thread and thus not in threaded engagement with the external thread of the support bolt. Since the portion of the base portion that is not in threaded engagement with the external thread of the support bolt is not directly involved in rigidly fixing the support bolt in position, it is possible to reduce the axial length of the base portion. But if the axial length of the outer peripheral surface of the base portion which is in contact with the inner surface of the bearing inner race is too short, it becomes difficult to assemble the tensioner assembly with high accuracy because the bearing inner race tends to be inclined relative to the axis of the base portion when the bearing is mounted on the base portion.

By determining the axial length of the outer peripheral surface of the base portion which is in contact with the inner surface of the bearing inner race so as to be equal to or larger than half the entire axial length of the bearing inner race 25a, the tensioner assembly can be assembled with sufficient accuracy.

In any of the above-described arrangements, the outer peripheral surface of the base portion is preferably a tapered surface having a diameter that increases axially rearwardly of the base portion, because with this arrangement, the bearing inner race can be easily fitted onto the base portion and thus the rolling bearing can be easily mounted in position.

In any of the above-described arrangements, the pulley arm, which is ordinarily made of a metal, is preferably made of aluminum or an aluminum alloy. If the pulley arm is made of an aluminum alloy, the above-described arrangements are especially advantageous in preventing cracks in the pulley arm.

According to the present invention, since the above-mentioned internal thread is formed only in the axially rear portion of the through hole of the pulley arm, it is possible to minimize the formation of cracks at the corner between the outer peripheral surface of the base portion of the pulley arm and the end surface of the shoulder of the base portion of the pulley arm.

DETAILED DESCRIPTION OF THE PREFERRED EMBODIMENTS

Now referring to the drawings, the tensioner assembly T (tension adjusting device) embodying the present invention includes a bracket 3 (also called a "pulley arm") provided on the slack side of a belt 1 so as to be pivotable about a pivot shaft 2, a tension pulley 4 supported on the pulley arm 3 at the remote end from the pivot shaft 2, and a tensioner A which applies an adjusting force to the pulley arm 3, thereby pressing the tension pulley 4 against the belt 1, keeping constant the tension of the belt 1.

The tensioner A may be any known one capable of adjusting the tension of the belt 1, such as a hydraulic auto-tensioner.

Since the tensioner assembly embodying the present invention is basically of the same structure as the conventional tensioner assembly, only what differs from this conventional tensioner assembly is described below.

Figure 1A:
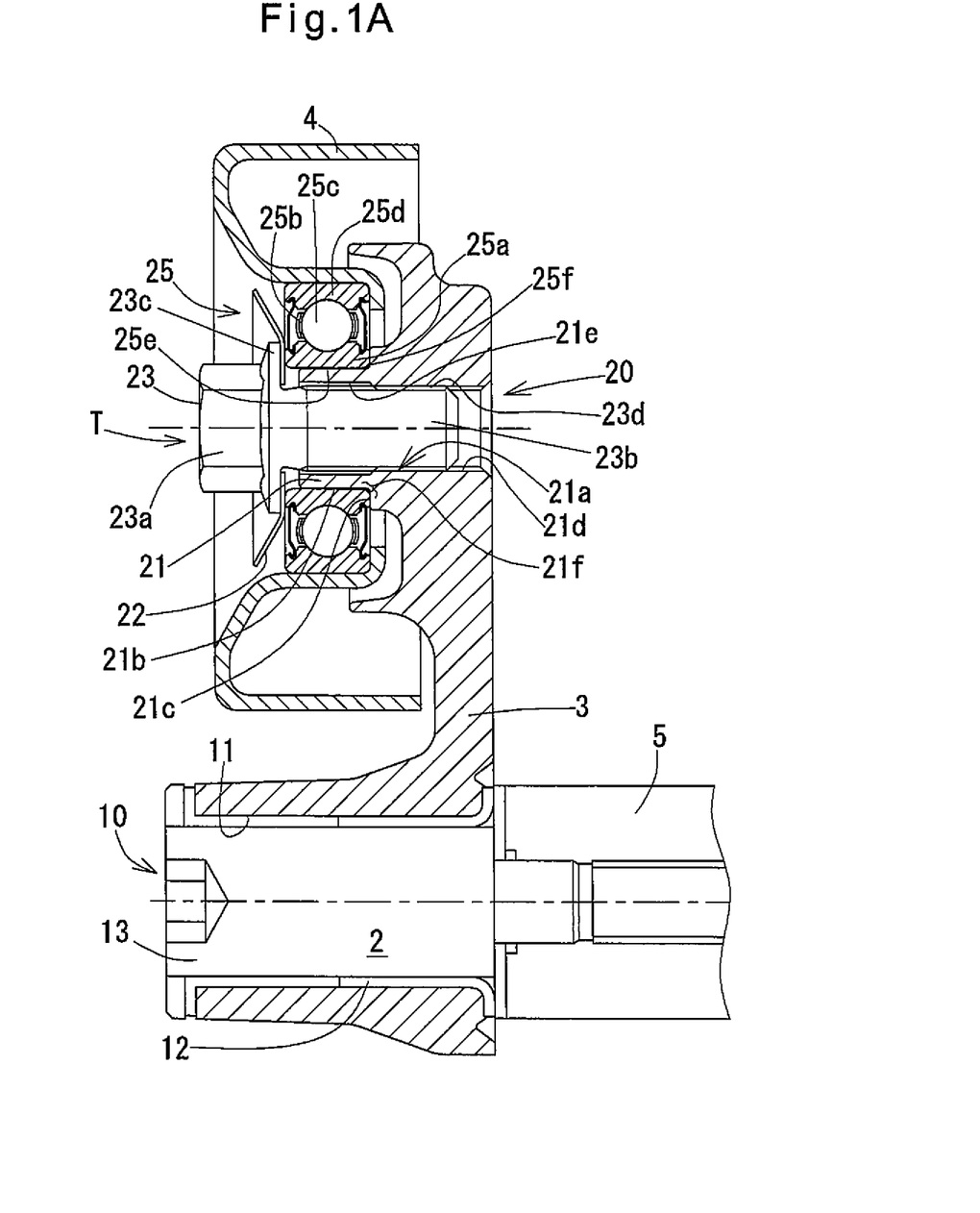
FIG. 1A is a vertical sectional view of a tensioner assembly embodying the present invention.

As shown in FIG. 1A, the pulley arm 3 has a pulley supporting section 20 on which the tension pulley 4 is mounted through a rolling bearing 25, which is a ball bearing in the embodiment but may be a bearing other than a ball bearing.

The pulley supporting section 20 includes a base portion 21 formed with a through hole 21a extending through the base portion 21 in the axial direction of the tension pulley 4 from the front to back surface of the pulley arm 3. The rolling bearing 25 includes an inner race 25a fitted around the outer peripheral surface 21b of the base portion 21.

The bearing 25 further includes an outer race 25d mounted around the inner race 25a through a plurality of rolling elements 25c retained in position in the circumferential direction by a retainer 25b. The tension pulley 4 is press-fitted on the outer race 25d. The tension pulley 4 is thus rotatably supported and guides the belt 1.

A support bolt 23 presses the inner race 25a of the rolling bearing 25 from the axial front side (from which the rolling bearing 25 and the tension pulley 4 are fitted onto the base portion) to the axial rear side (toward which the bearing 25 and the tension pulley 4 are pushed) through a washer 22. The washer 22 presses the inner race 25a and also serves to prevent entry of foreign matter.

When the support bolt 23 is threaded into the through hole 21a toward the axial rear side with the head 23a of the bolt 23 positioned on the axial front side, the external thread 23d of the support bolt 23 is brought into threaded engagement with an internal thread 21d of the through hole 21a. When the bolt 23 is completely pushed into the through hole 21a, the bearing inner race 25a is fixed to the base portion 21 with the radially inner surface 25e of the inner race 25a in abutment with the outer peripheral surface 21b of the base portion 21 and the rear end surface 25f of the inner race 25a in abutment with an end surface 21c of a shoulder of the base portion 21.

The internal thread 21d (including an incomplete thread portion, if any) is formed on the inner surface of the through hole 21a such that its axial front end is located in the vicinity of, or axially rearwardly of, the end surface 21c of the shoulder of the base portion 21.

Figure 1B:
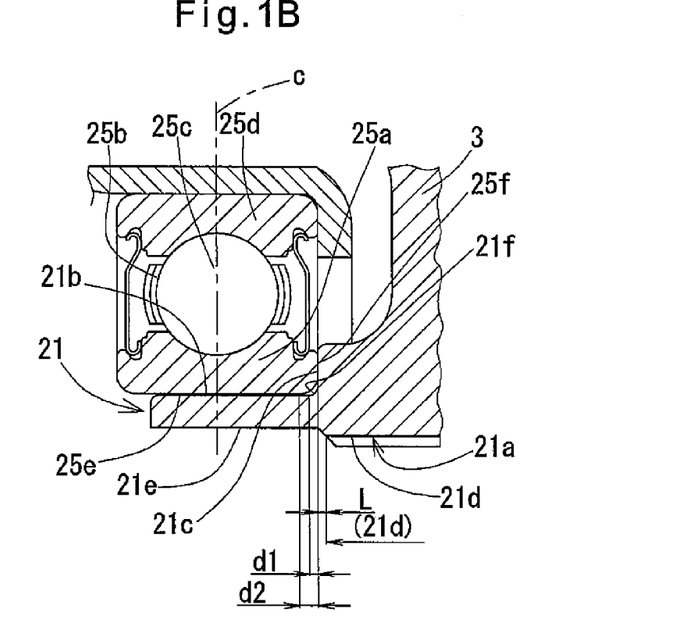
FIG. 1B is an enlarged view of a portion of the tensioner assembly of FIG. 1A.

In the embodiment of FIG. 1B, the axial front end of the internal thread 21d is located at a position axially rearwardly displaced from the end surface 21c of the shoulder of the base portion 21 by a distance L. As shown in FIG. 1A, the axial rear end of the internal thread 21d is located at the axial rear end of the through hole 21a.

By providing the internal thread 21d such that its axial front end is located axially rearwardly of the end surface 21c, the internal thread 21d meshes with the external thread 23d of the support bolt 23 only at the portion axially rearwardly of the end surface 21c, so that it is possible to reduce tensile stress applied to the axial portion of the base portion 21 where there is no internal thread 21d.

In particular, since the axial front end of the internal thread 21d is located axially rearwardly of the end surface 21c of the shoulder of the base portion 21, it is possible to reduce tensile force applied to the portion of the base portion 21 supporting the rolling bearing 25, including the tensile force applied to the corner 21f between the outer peripheral surface 21b and the end surface 21c of the shoulder, of the base portion 21. This in turn reduces cracks at the corner 21f of the pulley arm 3 while tightening the support bolt 23 or during use of the tensioner assembly T.

Figure 1C:
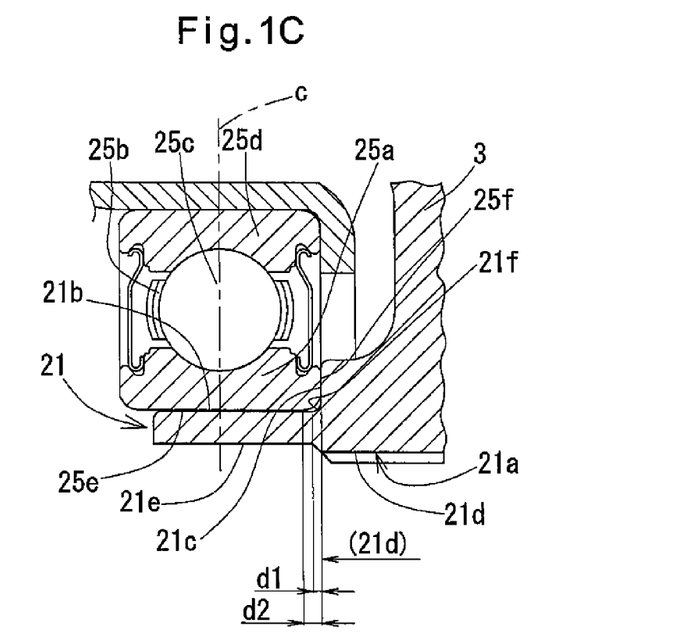
FIG. 1C is an enlarged view of a portion of a modified tensioner assembly.

As mentioned above, the internal thread 21d is formed on the inner surface of the through hole 21a such that its axial front end is located in the vicinity of, or axially rearwardly of, the end surface 21c of the shoulder of the base portion 21. That is, the internal thread 21d is provided such that it is possible to reduce tensile strength that could develop cracks at the corner 21f between the outer peripheral surface 21b and the end surface 21c of the shoulder, of the base portion 21. Therefore, preferably, the axial front end of the internal thread 21d is radially aligned with the end surface 21c of the shoulder (as shown in FIG. 1C), or located axially rearwardly of the end surface 21c of the shoulder (as shown in FIG. 1B).

Figure 2A:
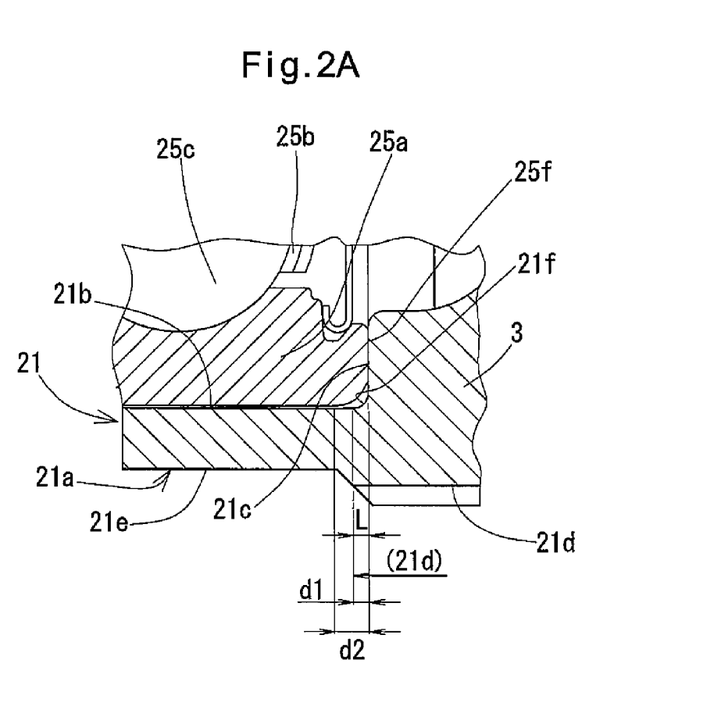
FIGS. 2A to 2C are enlarged views of portions of further modified tensioner assembly.
Figure 2B:
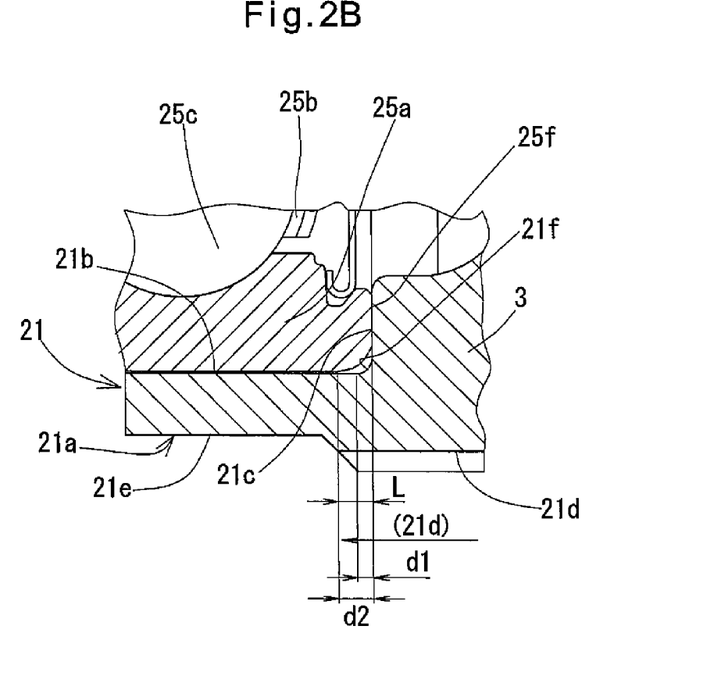
Figure 2C:
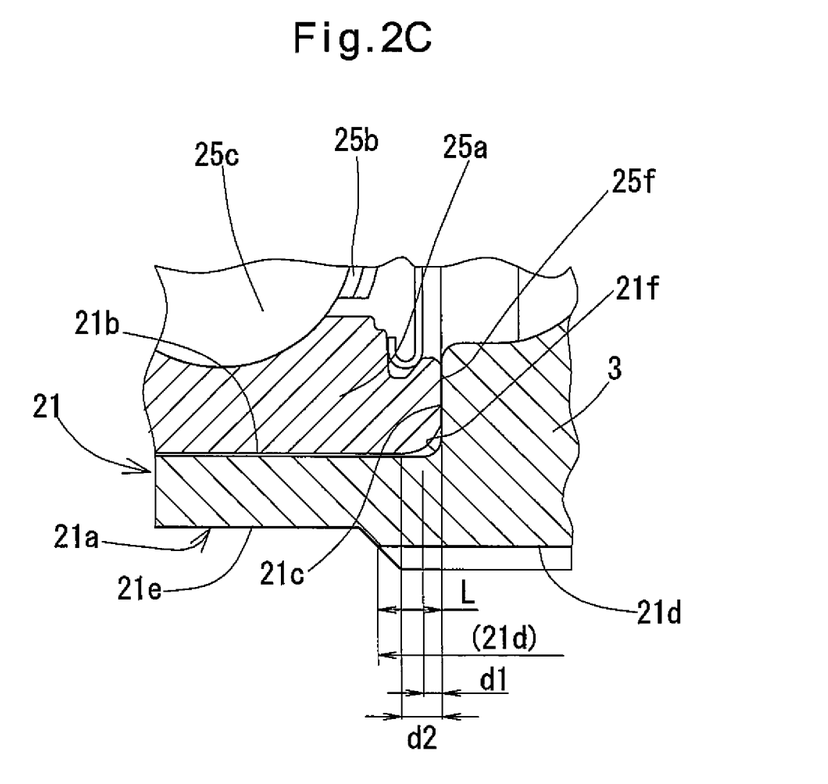

But as shown in FIGS. 2A to 2C, the axial front end of the internal thread 21d may be located slightly axially forwardly of the front end of the end surface 21c of the shoulder, provided such an internal thread can still sufficiently prevent development of cracks.

In the embodiment of FIGS. 2A to 2C, the outer peripheral surface 21b of the base portion 21 is smoothly connected to the end surface 21c of the shoulder of the base portion 21 through a continuously curved surface having an axial length d1 (which is equal to the radius of curvature of the curved surface).

In the embodiment of FIG. 2A, the internal thread 21d is provided such that its axial front end is radially aligned with the axial front end of the curved surface. But the axial front end of the internal thread 21d may be located slightly axially rearwardly of the axial front end of the curved surface. With this arrangement too, it is possible to effectively prevent cracks.

In any of the embodiments of FIGS. 2A to 2C, a chamfer is provided along the ridge between the inner surface 25e and the end surface 25f, of the bearing inner race 25a. The chamfer has an axial length d2.

In the embodiment of FIG. 2B, the internal thread 21d is provided such that its axial front end is radially aligned with the axial front end of this chamfer. But the axial front end of the internal thread 21d may be located slightly axially rearwardly of the axial front end of the chamfer. With this arrangement too, it is possible to effectively prevent cracks.

Preferably, the radius of curvature d1 of the above curved surface is 0.5 mm or over and smaller than the axial length d2 of the chamfer provided along the ridge between the inner surface 25e and the end surface 25f, of the bearing inner race 25a.

In the embodiment of FIG. 2C, the axial front end of the internal thread 21d is located axially forwardly of both the axial front end of the curved surface (shown by d1) and the axial front end of the chamfer (shown by d2).

But the distance between the axial front end of the internal thread 21d in FIG. 2C and the end surface 21c of the shoulder is not larger than about two pitches of the internal thread 21d, and thus this distance is sufficiently short compared to the entire axial length of the internal thread 21d, so that this internal thread can also prevent cracks at the corner 21f. The axial front end of the internal thread 21d of FIG. 2C is considered to be located in the vicinity of the end surface 21c of the shoulder.

Preferably, the outer peripheral surface 21b of the base portion 21d which is in contact with the inner surface 25e of the bearing inner race 25a has an axial length equal to or larger than half the entire axial length of the bearing inner race 25a.

The inner surface of the through hole 21a of the pulley arm 3 has a cylindrical portion, i.e. a portion not formed with the internal thread 21d and thus not in threaded engagement with the external thread 23d of the support bolt 23. Since the portion of the base portion 21 that is not in threaded engagement with the external thread 23d of the support bolt 23 is not directly involved in rigidly fixing the support bolt 23 in position, it is possible to reduce the axial length of the base portion 21. But if the axial length of the outer peripheral surface 21b of the base portion 21 which is in contact with the inner surface 25e of the bearing inner race 25a is too short, it becomes difficult to assemble the tensioner assembly with high accuracy because the bearing inner race 25a tends to be inclined relative to the axis of the base portion 21 when the bearing is mounted on the base portion.

By determining the axial length of the outer peripheral surface 21b of the base portion 21d which is in contact with the inner surface 25e of the bearing inner race 25a so as to be equal to or larger than half the entire axial length of the bearing inner race 25a, the tensioner assembly can be assembled with sufficient accuracy. For this purpose, the axial front end of the portion of the base portion 21 in contact with (and thus supporting) the bearing inner race 25a is located axially forwardly of the axial centerline c of the bearing inner race 25a. But actually, considering the chamfer of the bearing inner race 25a, the axial front end of the support portion of the base portion 21 is more preferably located axially forwardly of the point which is axially forwardly displaced from the axial centerline c of the bearing inner race 25a by the distance d2.

The outer peripheral surface 21b of the base portion 21 is preferably tapered such that its diameter gradually increases from its axial front end toward axial rear end. With this arrangement, the bearing inner race 25a and thus the entire rolling bearing 25 can be easily mounted on the base portion 21.

The axial rear end of the internal thread 21d is ordinarily located at the axial rear end of the through hole 21a because the internal thread 21d is ordinarily formed by inserting a tapping tool into the hole 21a from its axial rear end. But the axial rear end of the internal thread 21d may be located slightly forwardly of the axial rear end of the through hole 21a.

The internal thread 21d has an axial length 1.5 times the diameter of the support bolt 23 or over.

The above arrangements are effective in preventing cracks in the pulley arm especially if the pulley arm is made of aluminum or an aluminum alloy. But the pulley arm may be made of a different material such as iron.

What is claimed is:

1. A tensioner assembly comprising a pivot shaft, a pulley arm pivotable about the pivot shaft and having a base portion at an end of the pulley arm remote from the pivot shaft, a tension pulley rotatably mounted around the base portion through a rolling bearing, and a tensioner connected to the pulley arm and biasing the pulley arm such that the pulley arm pivots about the pivot shaft in a direction in which the tension pulley is pressed against a belt, thereby keeping constant the tension of the belt,
    wherein the rolling bearing comprises an inner race having a radially inner surface in contact with an outer peripheral surface of the base portion, and an end surface formed at an axial rear end of the inner race and in contact with an end surface of a shoulder of the base portion, and wherein the base portion is formed with a through hole for receiving a support bolt having an external thread, the through hole extending in an axial direction of the base portion and having an inner surface formed with an internal thread having an axial front end that is located axially rearwardly of the end surface of the shoulder of the base portion, radially aligned with the end surface of the shoulder of the base portion, or located axially forwardly of the end surface of the shoulder of the base portion by such a slight amount that meshing engagement between the internal thread of the through hole and the external thread of the support bolt when threaded therein would not produce tensile stress that would cause cracks at a corner of the base portion between the outer peripheral surface of the base portion and the end surface of the shoulder of the base portion.

2. The tensioner assembly of claim 1, wherein the outer peripheral surface of the base portion which is in contact with the inner surface of the bearing inner race has an axial length equal to or larger than half an entire axial length of the bearing inner race.

3. The tensioner assembly of claim 1, wherein the outer peripheral surface of the base portion is a tapered surface having a diameter that increases axially rearwardly of the base portion.

4. The tensioner assembly of claim 1, wherein the pulley arm is made of aluminum or an aluminum alloy.

5. A tensioner assembly comprising a pivot shaft, a pulley arm pivotable about the pivot shaft and having a base portion at an end of the pulley arm remote from the pivot shaft, a tension pulley rotatably mounted around the base portion through a rolling bearing, and a tensioner connected to the pulley arm and biasing the pulley arm such that the pulley arm pivots about the pivot shaft in a direction in which the tension pulley is pressed against a belt, thereby keeping constant the tension of the belt,
    wherein the rolling bearing comprises an inner race having a radially inner surface in contact with an outer peripheral surface of the base portion, and an end surface formed at an axial rear end of the inner race and in contact with an end surface of a shoulder of the base portion, and wherein the base portion is formed with a through hole extending in an axial direction of the base portion and having an inner surface formed with an internal thread having an axial front end that is radially aligned with, or located axially rearwardly of, the end surface of the shoulder of the base portion.

6. The tensioner assembly of claim 5, wherein the outer peripheral surface of the base portion which is in contact with the inner surface of the bearing inner race has an axial length equal to or larger than half an entire axial length of the bearing inner race.

7. The tensioner assembly of claim 5, wherein the outer peripheral surface of the base portion is a tapered surface having a diameter that increases axially rearwardly of the base portion.

8. The tensioner assembly of claim 5, wherein the pulley arm is made of aluminum or an aluminum alloy.

9. A tensioner assembly comprising a pivot shaft, a pulley arm pivotable about the pivot shaft and having a base portion at an end of the pulley arm remote from the pivot shaft, a tension pulley rotatably mounted around the base portion through a rolling bearing, and a tensioner connected to the pulley arm and biasing the pulley arm such that the pulley arm pivots about the pivot shaft in a direction in which the tension pulley is pressed against a belt, thereby keeping constant the tension of the belt,
    wherein the rolling bearing comprises an inner race having a radially inner surface in contact with an outer peripheral surface of the base portion, and an end surface formed at an axial rear end of the inner race and in contact with an end surface of a shoulder of the base portion, and wherein the base portion is formed with a through hole for receiving a support bolt having an external thread, the through hole extending in an axial direction of the base portion and having an inner surface formed with an internal thread having an axial front end that is located axially rearwardly of the end surface of the shoulder of the base portion, radially aligned with the end surface of the shoulder of the base portion, or located axially forwardly of the end surface of the shoulder of the base portion by no more than two pitches of the internal thread.

10. The tensioner assembly of claim 9, wherein the outer peripheral surface of the base portion which is in contact with the inner surface of the bearing inner race has an axial length equal to or larger than half an entire axial length of the bearing inner race.

11. The tensioner assembly of claim 9, wherein the outer peripheral surface of the base portion is a tapered surface having a diameter that increases axially rearwardly of the base portion.

12. The tensioner assembly of claim 9, wherein the pulley arm is made of aluminum or an aluminum alloy.

* * * * *